(12) United States Patent
Ruppert

(10) Patent No.: US 12,095,328 B2
(45) Date of Patent: Sep. 17, 2024

(54) ELECTRIC MACHINE

(71) Applicant: Schaeffler Technologies AG & Co. KG, Herzogenaurach (DE)

(72) Inventor: Andreas Ruppert, Bühlertal (DE)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 232 days.

(21) Appl. No.: 17/630,703

(22) PCT Filed: Jul. 7, 2020

(86) PCT No.: PCT/DE2020/100593
§ 371 (c)(1),
(2) Date: Jan. 27, 2022

(87) PCT Pub. No.: WO2021/023334
PCT Pub. Date: Feb. 11, 2021

(65) Prior Publication Data
US 2022/0263370 A1 Aug. 18, 2022

(30) Foreign Application Priority Data
Aug. 6, 2019 (DE) ............. 10 2019 121 184.0

(51) Int. Cl.
*H02K 3/50* (2006.01)
*H02K 5/22* (2006.01)
*H02K 15/04* (2006.01)

(52) U.S. Cl.
CPC .......... *H02K 3/50* (2013.01); *H02K 5/225* (2013.01); *H02K 15/0421* (2013.01); *H02K 2203/09* (2013.01)

(58) Field of Classification Search
CPC ...... H02K 3/50; H02K 15/0421; H02K 5/225; H02K 2203/09; H02K 2203/06; H02K 3/52; H02K 3/38; H02K 3/28
USPC .......................................................... 310/71
See application file for complete search history.

(56) References Cited

U.S. PATENT DOCUMENTS

| 2014/0232215 A1* | 8/2014 | Takasaki ............ H02K 11/0094 310/43 |
| 2018/0278113 A1* | 9/2018 | Asahi ....................... H02K 5/24 |
| 2022/0149690 A1* | 5/2022 | Wittstadt ................. H02K 3/50 |

FOREIGN PATENT DOCUMENTS

| CN | 102820724 A | 12/2012 |
| CN | 103828197 A | 5/2014 |
| CN | 104953745 A | 9/2015 |
| CN | 106663985 A | 5/2017 |
| CN | 107112845 A | 8/2017 |
| CN | 108512335 A | 9/2018 |
| CN | 208508031 U | 2/2019 |
| CN | 110050405 A | 4/2019 |
| DE | 202009005531 U1 | 8/2010 |

(Continued)

*Primary Examiner* — Alexander A Singh

(57) ABSTRACT

An electric machine is disclosed that includes a stator with a winding having a plurality of conductors associated with one or more phases and interconnected with one another. The ends of at least part of the conductors protrudes from the winding, wherein one part of said ends is connected to an interconnecting ring placed axially on the winding and a further part of said ends is connected to a current connection arranged radially outside the winding via connecting conductors. The connecting conductors are fixed to at least one holding element provided on the interconnecting ring.

14 Claims, 3 Drawing Sheets

(56) References Cited

FOREIGN PATENT DOCUMENTS

| | | |
|---|---|---|
| DE | 102015200093 A1 | 7/2016 |
| DE | 102016200115 A1 | 7/2017 |
| DE | 102018103788 A1 | 8/2018 |
| DE | 102019103191 A1 | 8/2020 |
| DE | 102019111825 A1 | 11/2020 |
| EP | 2752974 A1 | 9/2014 |
| FR | 3054745 A1 | 2/2018 |
| JP | 2011182512 A | 9/2011 |
| WO | 2015059775 A1 | 4/2015 |
| WO | 2019082708 A1 | 5/2019 |

\* cited by examiner

ELECTRIC MACHINE

CROSS-REFERENCE TO RELATED APPLICATIONS

This application is the U.S. National Phase of PCT Appln. No. PCT/DE2020/100593 filed Jul. 7, 2020, which claims priority to DE 102019121184.0 filed Aug. 6, 2019, the entire disclosures of which are incorporated by reference herein.

TECHNICAL FIELD

The disclosure relates to an electric machine, comprising a stator having a winding comprising a plurality of conductors associated with one or more phases and interconnected with one another.

BACKGROUND

Electric machines comprising a rotor and a stator are used in different areas of application. The use of electric machines for electric hybrid vehicles and electric vehicles, or for hub drives is to be mentioned only as an example. If such an electric machine is used as a drive machine, it is usually designed as an internal rotor, i.e., the stator surrounds the internal rotor. A moving magnetic field is generated via the stator, which causes the rotor to rotate. For this purpose, the stator has a winding consisting of a large number of conductors, wherein the conductors are associated with one or usually more phases.

Not only the number of phases is included in the design of the winding geometry, but also the number of wires per phase as well as the number of wires per slot within the stator toothing and the number of pole pairs. This variety of conductors and winding parameters creates a complex network of conductors that is built up using different winding technologies. Examples include hairpin or bar wave windings. Here, the conductors are formed by means of rods bent into a U-shape, which are put together to form a winding cage. The conductors are laid on a plurality of radial planes, wherein the conductors move from plane to plane, so to speak. To Ram these meandering, circumferential conductors, they are to be connected accordingly at their ends, which is usually done by welding the conductor ends that are adjacent to one another. The conductor ends converge at one point or on one winding side in the form of what is termed the star, where they are connected to one another. In this region, the connection of the individual phases to an external power supply, i.e., a current connection, which is used to generate the magnetic field, must be made, which is often very difficult to implement for reasons of installation space.

SUMMARY

The disclosure is based on the problem of specifying an electric machine that is improved in comparison.

To solve this problem, in an electric machine of the type mentioned, the disclosure provides that the ends of at least part of the conductors protrude from the winding, wherein one part of said ends is connected to an interconnecting ring placed axially on the winding and a further part of said ends is connected to a current connection arranged radially outside the winding via connecting conductors, wherein the connecting conductors are fixed to at least one holding element provided on the interconnecting ring.

According to the disclosure, it is provided that the actual conductor interconnection, i.e., the connection of the individual conductors to form the corresponding phase-specific meander structures, and the interconnection for coupling with the power supply are to be separated via a high-voltage terminal. An interconnecting ring is used for the actual conductor connection, i.e., a conductor ring that is axially attached separately on the winding, which forms the star point of the electric machine here and at which all phases, in most cases three phases, converge. This conductor ring engages in the region of the protruding conductor ends, wherein the conductor ends can protrude axially on the inner circumference and/or on the outer circumference of the winding, i.e., the interconnecting ring, when placed axially, engages radially between the conductor ends protruding axially in the area of the inner and outer circumference of the winding. The conductor ends are associated with the individual conductor sections, unless they are connected to one another on other, for example further inward, radial planes. The conductor ends are connected to the interconnecting ring, usually welded to it accordingly, so that the corresponding phase-specific conductor structures or conductor connections are generated via the interconnecting ring.

To connect the winding to the actual current connection, i.e., the high-voltage terminal, corresponding connecting conductors are provided according to the disclosure, which phase-specifically connect the conductor ends protruding axially over the winding to the corresponding phase-specific contact areas of the current connection or HV terminal. These connecting conductors have a certain length after the current connection and thus the corresponding contact areas on the one side and the protruding ends of the stator on the other side are spaced apart from one another due to the separation of the interconnecting ring and the current connection. In order to prevent these connecting conductors, which can be rectangular or round in cross-section, from oscillating or vibrating during operation, due to any vibrations in the drive train, the disclosure provides that the connecting conductors are fixed to at least one holding element provided on the interconnecting ring. This means that the connecting conductors are not only connected to the conductor ends on the one hand and the contact areas on the other hand via their actual contact points, i.e., welded connections, but are also fixed along their length to at least one holding element provided on the interconnecting ring. This enables a sufficiently rigid connection of the connecting conductors to or within the machine; on the other hand, the conductor configuration is still flexible enough to be able to compensate for any vibrations in the drive train.

The almost nested, axial and radial arrangement of the interconnecting ring and power supply terminal, i.e., the high-voltage connection, results in a very compact, space-saving stricture. In addition, the assembly is also simplified, since the conductors or wires to be connected via the interconnecting ring only have to be cut to length and brought into the appropriate position when the winding cage is plugged together in order to be connected to the corresponding connection terminals of the interconnecting ring, which are of course positioned accordingly. Both the cutting to length and, of course, the assembly can take place in an automated assembly process, as can of course also be compensated for due to the simple connection of conductor ends and interconnecting ring. This is not least due to the fact that the interconnecting ring and the power supply or the HV terminal are two separate assemblies that are connected in different process steps to the stator and then also to the finished electric machine.

In addition, the additional fixing of the connecting conductors according to the disclosure, which couple the two separate assemblies, the interconnecting ring and the current connection, allows a secure, but still sufficiently flexible laying of a conductor on at least one interconnecting ring-side retaining element, so that it ensures that they are not subjected to any strong oscillations or vibrations during operation which can have a detrimental effect on their welded contact connections, but that they are still sufficiently flexible to be able to compensate for any such oscillations or vibrations.

Since, depending on the position of the phase-specific ends of the individual conductors, the connecting conductors can have a considerable length and, for example, circulate around a circumferential angle of up to 90°, a plurality of holding elements spaced apart in the circumferential direction can be provided on the interconnecting ring, so that the connecting conductors are fixed to two or more holding elements.

The interconnecting ring itself advantageously has a housing on which the holding element or elements are arranged. Corresponding separate line bridges are accommodated in this housing and are connected to the ends of the conductors, connecting them to form the corresponding meander structure. These line bridges, which are correspondingly stable metal sheets, which are geometrically shaped so that they reach the corresponding conductor ends to be connected, are grouped into the corresponding circuit ring and allow easy bridging of corresponding distances both in the circumferential and radial direction. These line bridges, like the individual conductors and connecting conductors, are of course isolated from one another. They have corresponding, preferably radially protruding connection sections to which the ends of the conductors protruding from the winding are welded. To enable the tightest possible packing, the line bridges are arranged radially and axially offset to one another and nested as closely as possible, wherein the geometric design of the individual line bridges always takes into account the winding geometry, as well as the position of the conductor ends to be connected. In order to receive and fix this tight packing or these line bridges in a defined manner, according to the disclosure a corresponding housing is provided which, for example, has lateral openings through which the connection sections protrude. This means that the interconnecting ring is suitably housed and consequently can be placed axially on the winding cage as a fully assembled unit and positioned in relation to the conductor ends. The one or more holding elements are arranged on this housing, which means that this housing is therefore multifunctional and not only serves to form the interconnecting ring or the housing of the line bridges, but also as a carrier for the one or more holding elements and thus as a mounting location. The one or more holding elements are therefore not to be attached to any more or less undefined areas in the region of the winding heads, but can be provided at defined positions on the interconnecting ring or its housing.

In this case, the one or more holding elements are each preferably designed as a latching or clamping element, on which one or more connecting conductors are fixed via a latching or clamping connection. Designing the one or more holding elements in this way as a latching or clamping element enables the connecting conductor to be easily fixed or connected to the corresponding holding element. This is because the connecting conductor can be fastened to it in a simple manner via a latching or clamping connection, that is to say that additional fastening means are not required.

The one or more latching or clamping elements can each have one or more axially or radially open U-shaped recesses for latching or clamping fixation. For the purposes of assembly, according to this alternative of the disclosure, the respective connecting conductor is accordingly introduced into the open U-shaped recess and latched in place or clamped therein. In one embodiment, the U-shaped recess can be axially open, which means that the one or more connecting conductors can be pushed in axially from the free winding head side and can thus be latched or clamped. Alternatively, in the case of radially open U-shaped recesses, it is also possible to latch or clamp the one or more connecting conductors into the recess from the side.

If the one or more latching or clamping elements is designed as an axially open U-shaped recess, one leg of this U-shaped recess can be flexible and clamp the connecting conductor or conductors in the recess. In this way, a corresponding flexible or elastic clamping fixation is realized in that the one or more connecting conductors are tensioned via the flexible leg against an abutment, that is to say an opposite leg or housing section. This can be a purely radial clamping, but a clamping with a tangential or axial component is also conceivable.

It is useful here if the flexible leg has one or more slots, forming separate flexible leg sections. Particularly if the holding element extends a certain distance around the circumference of the winding, it is expedient to form two or more elastic leg sections so that this results in a geometrically more flexible adaptation and thus tensioning.

In the event that, in addition to a clamping fixation, a latching fixation is also to take place which prevents the one or more connecting conductors from slipping out of the U-shaped recess again, it is useful if at least one latching projection is provided on the flexible leg or on one or all of the flexible leg sections, on or behind which the one or more connecting conductors latch. This latching projection overlaps, for example, the one or more connecting conductors introduced into the U-shaped recess in the fixing position, so that in the unlikely event of an axial movement these would run against the latching projection and this would limit any further movement.

Alternatively, as stated, the one or more holding elements can have one or more radially open latching or clamping recesses. A connecting conductor engages in each of these, wherein in the case of a latching recess, the one or more latching recesses each have at least one latching projection, on or behind which the respective connecting conductor latches. While in the embodiment described above where the connecting conductors are pushed in axially in relation to the axis of rotation, here the connecting conductors are clamped or clipped-in radially from the side. Either the one or more holding elements are designed as a pure clamping recess, that is, a pure clamping fixation is provided. Alternatively, a latching fixation can also be provided, wherein here the one or more latching recesses have a corresponding latching projection.

As described, the one or more holding elements are attached to the housing. It is particularly preferred here that the housing is made from plastic and forms the one or more holding elements in one piece thereon. This means that the housing is a simple plastic injection-molded part on which not only the geometries required to accommodate the line bridges are formed, but at the same time also the one or more holding elements, regardless of the specific geometrical configuration.

BRIEF DESCRIPTION OF THE DRAWINGS

The disclosure is explained below on the basis of exemplary embodiments with reference to the drawings. The drawings are schematic representations, wherein.

DETAILED DESCRIPTION

Figure 1:
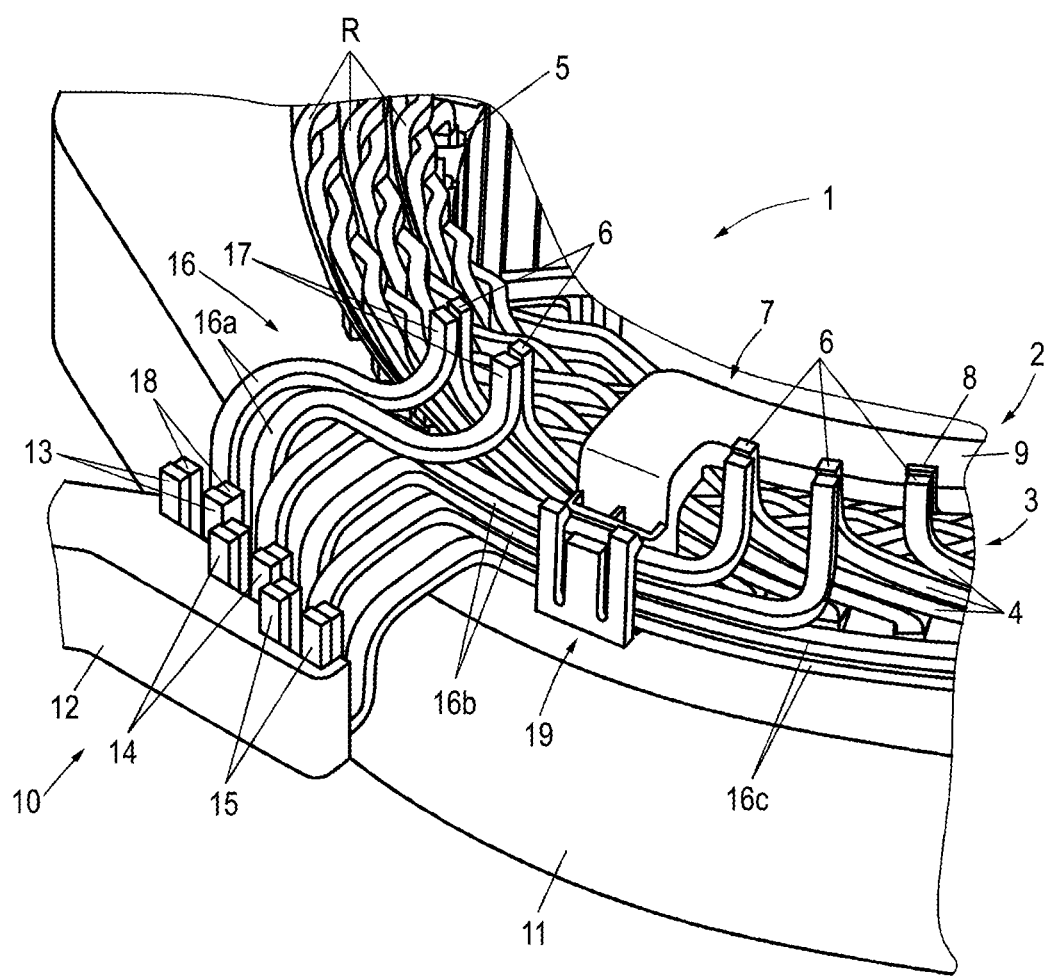
FIG. 1 shows a schematic diagram in the form of a partial view of an electric machine according to the disclosure.

FIG. 1 shows, in the form of a partial view, a schematic diagram of an electric machine 1 according to the disclosure, comprising a stator 2 having a winding 3 with a plurality of conductors 4, which are associated with 3 separate phases in the example shown. Each conductor 4 is designed as a U-shaped bracket, so to speak, wherein a plurality of such U-shaped conductors 4, often also called hairpins, are plugged together to form the winding 3, which can also be referred to as a winding cage. The plurality of conductors 4 define different radial planes R, as shown in FIG. 1. For this purpose, the conductors 4 extend, depending on the winding diagram, from one radial plane R to another radial plane R, for example an adjacent radial plane R, in the region in which they are connected to the conductor ends of corresponding adjacent conductors continuing the phase conductor.

The conductors 4 are guided so as to be bent and laid in such a way that corresponding recesses result, which extend radially so that corresponding stator teeth 5 engage in these recesses or the corresponding conductors 4 are wound between the corresponding grooves of the stator teeth 5. The basic structure of such a stator 2 or a winding 3 wound from the separate bracket-shaped conductors 4 described is basically known.

In the stator 2 according to the disclosure, the ends 6 of the conductors 4, insofar as the ends 6, which in the example shown terminate at the outer circumference of the annular winding 3, are axially protruding, i.e., they protrude axially from the winding 3. These ends 6 are associated with individual conductors 3, which in turn are associated with different phases, which is why the conductor ends must be connected according to the routing diagram of the conductor 4. For this purpose, an interconnecting ring 7 is used, which is placed axially on the end face of the winding 3 and positioned with regard to the conductor ends 6. The interconnecting ring 7 comprises a plurality of corresponding line bridges and connection sections 8 (see FIG. 2 in this regard) which protrude to the side from a housing 9 of the interconnecting ring 7, and after the interconnecting ring 7 has been positioned with regard to the conductor ends 6 to which they are to be connected, they are arranged to be precisely positioned. The connection is made by simple welding so that all conductors 4 are correctly and phase-specifically interconnected when they are connected.

Furthermore, a power supply 10 is provided, which is also called an HV terminal, and which is arranged radially next to the winding 2, here also almost outside the stator housing 11. This power supply 10 comprises a housing 12 in which corresponding busbars are arranged, which protrude from the housing with their connection terminals 13, 14, 15, which are each assigned as pairs of corresponding phases.

In the present case, as described, a 3-phase stator is shown, which is why three such connection terminal pairs are also provided in the example shown.

Each connection terminal 13, 14, 15 is to be connected to one phase of the winding 3. Corresponding connecting conductors 16 are provided for this purpose, wherein in the example shown, two conductor ends 6 are connected to one connection terminal 13, 14, or 15 in each case via two separate connecting conductors 16. The connecting conductors, which can also be called busbars, are also connected to the connection terminals 13, 14, 15 via corresponding welded connections, just as they are in contact with the conductor ends 6 via corresponding welded connections. Since both the conductor ends 6 and the connection terminals 13, 14, 15 protrude axially, the corresponding connection sections 17, 18 of the connecting conductors 16 also run axially.

Figure 2:
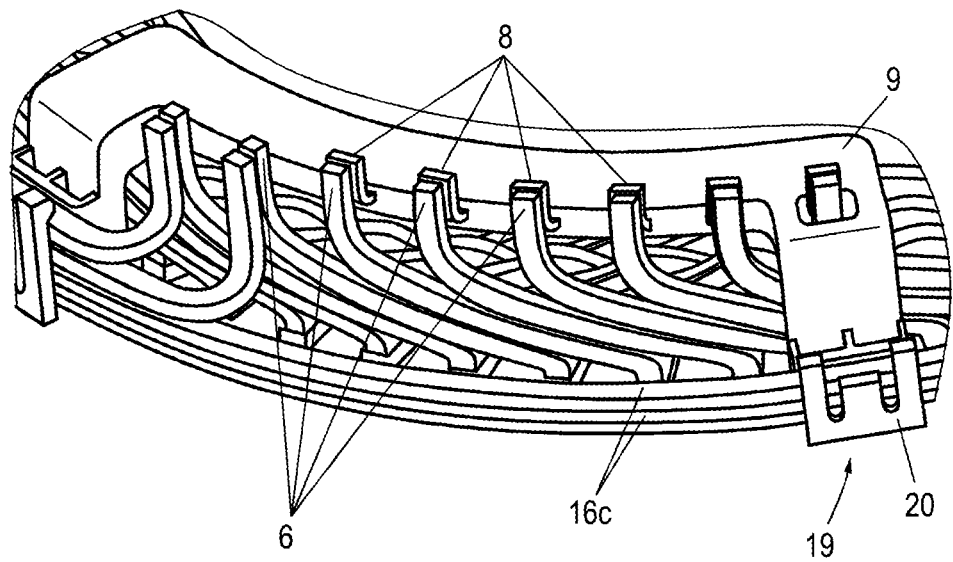
FIG. 2 shows a further schematic diagram corresponding to FIG. 1, showing the complete interconnecting ring.

FIGS. 1 and 2 show respective, connected partial views, that is to say that the partial view according to FIG. 2 continues the partial view according to FIG. 1. It can be seen that the connecting conductors 16 are of different lengths, depending on where the corresponding two conductor ends 6 to which they are to be connected are positioned circumferentially. In particular, in order to prevent longer connecting conductors 16 from hanging freely over too long a section, so that the connecting conductors 16 would also absorb any vibrations that may occur during operation, which can have a detrimental effect on the welded connection, in the example shown two holding elements 19 are formed on housing 9 of the interconnecting ring 7 which serve to accommodate one, two or more pairs of connecting conductors 16. This means that the connecting conductors 16 are circumferentially fixed one or more times so that they do not hang freely over too long a length, as this can lead to the disadvantages described above.

In the example shown, three connecting conductor pairs 16a, 16b and 16c are provided, wherein the connecting conductor pair 16a is the shortest, the connecting conductor pair 16b is somewhat longer and the connecting conductor pair 16c is the longest conductor pair. As FIGS. 1 and 2 show, the two connecting conductor pairs 16b and 16c are accommodated in the holding element 19, while only the connecting conductor pair 16c is accommodated in the holding element 19 shown in FIG. 2.

Figure 3:
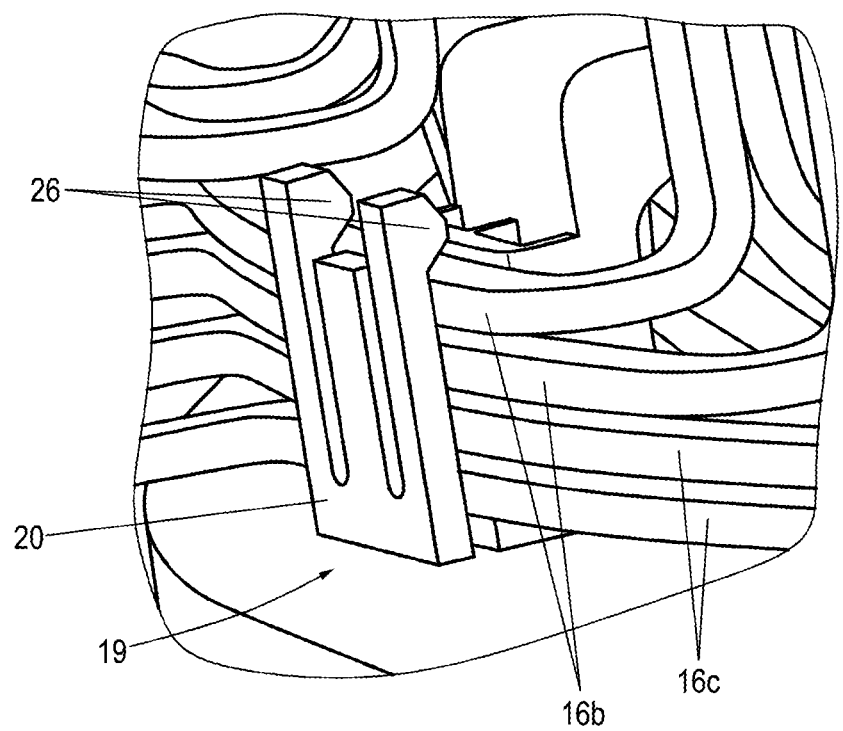
FIG. 3 shows an enlarged partial view from FIG. 1 showing a holding element formed on the interconnecting ring housing.
Figure 4:
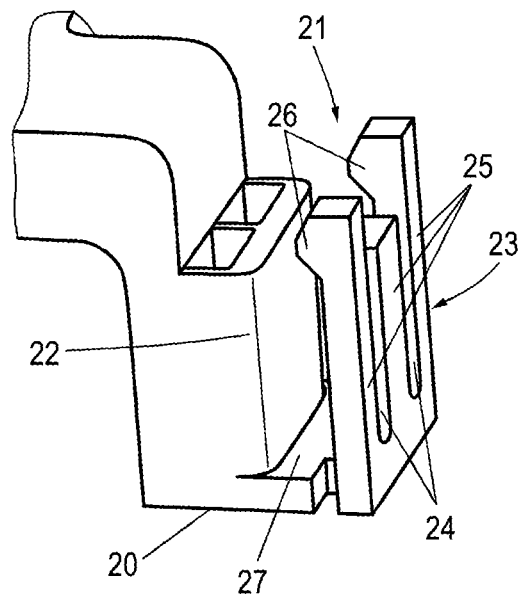
FIG. 4 shows an enlarged perspective view of the holding element from FIG. 3 without a connecting conductor.

Regardless of how many connecting conductors or connecting conductor pairs are accommodated, each holding element 19 in the example shown is designed as a latching element 20 with a combined latching and clamping function. FIG. 3 shows in an enlarged illustration the holding element 19 shown in FIG. 1 with the two connecting conductor pairs 16b, 16c fixed therein. Since the housing is made of plastic, it is formed in one piece on this plastic housing, that is to say it is an integral part of the housing 9. It is designed as an axially upwardly open U-shaped recess 21 (see FIG. 4) and formed via an inner first leg 22 and an outer, flexible leg 23 which is slotted over two slots 24 so that three resilient leg sections 25 are formed. For purposes of assembly, the respective connecting conductor is pushed in axially from above. Here it runs along two latching projections 26 which are provided at the ends on the two outer elastic legs 25. These spring somewhat outwards, so that the respective connecting conductor can be pressed into the U-shaped recess 21 and guided against a stop 27 on the bottom, as far as the first connecting conductor to be introduced is concerned. Gradually, all of the connecting conductors 16 are inserted, wherein the flexible leg sections 25 brace the connecting conductors 16 against the fixed inner leg 22, so that a clamping fixation is provided. At the same time, the overlapping of the latching projections 26 via the connecting conductors 16 also ensures that they are firmly latched in the U-shaped recess 21.

The latching element 20 shown in FIG. 2 is also designed in a corresponding but somewhat shorter, form. Since only the pair of connecting conductors 16c is to be received there, the leg sections 25 are somewhat shorter, yet they also have corresponding elastic clamping properties by means of which the connecting conductors are pressed against the opposite leg. There they are also held in position via the corresponding latching projections 26.

The housing 9 is therefore multifunctional. It serves to accommodate the line bridges (not shown in more detail) on the one hand, but on the other hand, it also serves as a carrier for the holding elements 19 and thus as a mounting location for the connecting conductors 16.

Figure 5:
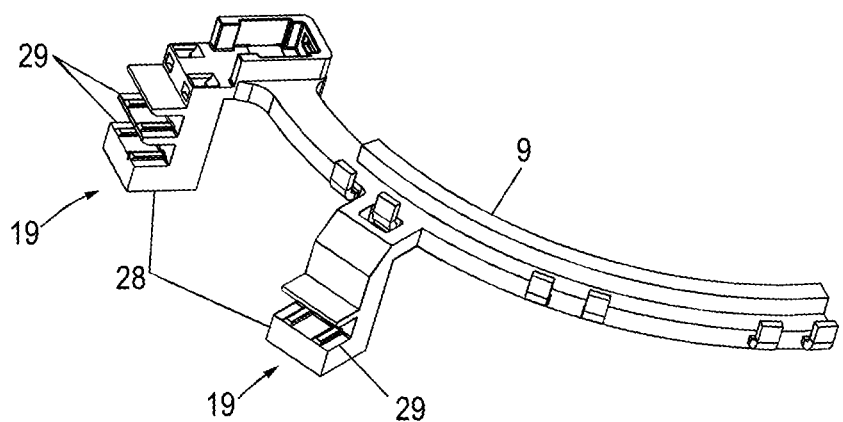
FIG. 5 shows a perspective view of an interconnecting ring in a further embodiment.

An alternative embodiment with regard to the design of the holding elements 19 is shown in FIG. 5. There the holding elements 19 are also designed as latching or clamping elements 28, but these latching or clamping elements 28 have U-shaped recesses 29 that are open radially outward. On the latching or clamping element 28 shown on the left in FIG. 5, two such recesses 29 are formed for one pair of connecting conductors 16b, 16c respectively, while on the latching or clamping element 28 shown on the right, only one recess 29 is provided for the pair of connecting conductors 16c. Here the individual connecting conductors are introduced radially from the side into the respective U-shaped recess 29 and clamped therein, or optionally also latched in place, for which purpose corresponding latching projections would be provided. In any case, however, the corresponding legs delimiting the recess are again designed to be correspondingly flexible so that a corresponding clamping fixation takes place, in particular to the lowermost, stronger leg.

In this embodiment, too, the holding elements 19 are integrally formed on the plastic housing 9 of the interconnecting ring 7, that is to say in one piece. As a result, only a single component has to be provided here to fulfill the housing function and the fastening function.

LIST OF REFERENCE NUMBERS

1 Electric machine
2 Stator
3 Winding
4 Conductor
5 Stator tooth
6 End
7 Interconnecting ring
8 Connection section
9 Housing
10 Current connection
11 Stator housing
12 Housing
13 Connection terminal
14 Connection terminal
15 Connection terminal
16 Connecting conductors
17 Connection section
18 Connection section
19 Holding element
20 Latching or clamping element
21 Recess
22 Leg
23 Leg
24 Slot
25 Leg section
26 Latching projection
27 Stop
28 Latching or clamping element
29 Latching or clamping recess

The invention claimed is:

1. An electric machine, comprising a stator having a winding comprising a plurality of conductors associated with one or more phases and interconnected with one another, wherein ends of at least part of the conductors protrude from the winding, wherein one part of said ends is connected to an interconnecting ring placed axially on the winding and a further part of said ends is connected to a current connection arranged radially outside the winding via connecting conductors, wherein the connecting conductors are fixed to at least one holding element provided on the interconnecting ring-ring, wherein the at least one holding element is designed as a latching or clamping element, on which one or more of the connecting conductors are fixed via a latching or clamping connection.

2. The electric machine according to claim 1, wherein the at least one holding element includes a plurality of holding elements that are provided on the interconnecting ring at a distance from one another.

3. The electric machine according to claim 1, wherein the interconnecting ring has a housing in which the at least one holding element is arranged.

4. The electric machine according to claim 3, wherein the at least one holding element is formed as one piece on the housing, which is made of plastic.

5. The electric machine according to claim 1, wherein the latching or clamping element has one or more axially or radially open U-shaped recesses for latching or clamping fixation.

6. The electric machine according to claim 5, wherein the latching or clamping element is designed as an axially open U-shaped recess, wherein one leg is flexible and the one or more of the connecting conductors are clamped in the U-shaped recess.

7. The electric machine according to claim 6, wherein the flexible leg has one or more slots which form separate flexible leg sections.

8. The electric machine according to claim 6, wherein at least one latching projection is provided on the flexible leg, on or behind which the one or more of the connecting conductors latch.

9. The electric machine according to claim 5, wherein each holding element has one or more radially open latching or clamping recesses, in each of which the at least one of the connecting conductors engage, wherein in the case of a latching recess, the latching recesses have at least one latching projection, on or behind which the respective connecting conductor latches.

10. An electric machine, comprising:
a stator having a winding comprising a plurality of conductors associated with one or more phases and interconnected with one another, wherein the conductors include ends that protrude from the winding;
a current connection arranged radially outside the winding via connecting conductors, wherein a first part of the ends of the conductors is connected to the current connection; and
an interconnecting ring placed axially on the winding and including a holding element, wherein a second part of the ends of the conductors is connected to the interconnecting ring, the holding element comprising an inner leg, an outer flexible leg, and an axially open U-shaped recess formed between the inner leg and the outer flexible leg, wherein one or more of the connecting conductors are clamped in the U-shaped recess.

11. The electric machine according to claim 10, wherein the outer flexible leg includes two or more flexible leg sections separated by one or more slots.

12. The electric machine according to claim 11, wherein the outer flexible leg includes a first leg section, a second leg section, and a third leg section, wherein a first slot is defined between the first and the second leg sections and a second slot is defined between the second and the third leg sections.

13. The electric machine according to claim 10, wherein at least one latching projection is provided on the outer flexible leg, wherein on or behind which the one or more of the connecting conductors is secured within the U-shaped recess by the latching projection.

14. The electric machine according to claim 10, wherein the holding element is formed integrally with a housing of the interconnecting ring.

* * * * *